(12) United States Patent
Secibovic

(10) Patent No.: US 11,964,319 B2
(45) Date of Patent: Apr. 23, 2024

(54) DEVICE AND METHOD FOR MONITORING RELATIVE MOVEMENTS

(71) Applicant: TRUMPF Maschinen Austria GmbH & Co. KG., Pasching (AT)

(72) Inventor: Kabir Secibovic, Gunskirchen (AT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 871 days.

(21) Appl. No.: 16/981,792

(22) PCT Filed: Apr. 2, 2019

(86) PCT No.: PCT/AT2019/060110
§ 371 (c)(1),
(2) Date: Sep. 17, 2020

(87) PCT Pub. No.: WO2019/191794
PCT Pub. Date: Oct. 10, 2019

(65) Prior Publication Data
US 2021/0107050 A1 Apr. 15, 2021

(30) Foreign Application Priority Data
Apr. 4, 2018 (AT) .............................. A 50273/2018

(51) Int. Cl.
*B21D 43/10* (2006.01)
*B25J 9/16* (2006.01)
(Continued)

(52) U.S. Cl.
CPC .......... *B21D 43/105* (2013.01); *B25J 9/1612* (2013.01); *B25J 13/083* (2013.01); *B25J 15/0206* (2013.01)

(58) Field of Classification Search
CPC ... B21D 43/105; B25J 9/16212; B25J 13/083; B25J 15/0206
See application file for complete search history.

(56) References Cited

U.S. PATENT DOCUMENTS 3,904,234 A  9/1975  Hill et al.
4,605,354 A  8/1986  Daly
(Continued)

FOREIGN PATENT DOCUMENTS

CN  103144094 A  6/2013
CN  105818169 A  8/2016
(Continued)

OTHER PUBLICATIONS

International Search Report in PCT/AT2019/060110, dated Aug. 9, 2019.

*Primary Examiner* — Kyle O Logan
(74) *Attorney, Agent, or Firm* — Collard & Roe, P.C.

(57) ABSTRACT

The invention relates to a gripping device (1) and a method for the monitored movement of objects (2), preferably sheet metals, comprising a system control (3) configured for processing object data (31) and controlling a gripping module (4), wherein the gripping module (4) has at least two gripping jaws (5) formed to cooperate with one another, which form an intermediate receiving space (6) for receiving at least parts of an object (2) to be monitored and transported, and the gripping jaws (5) are formed such that, by applying a pre-definable clamping force (7), at least a friction-type connection between the gripping jaws (5) and at least parts of the object (2) is made possible, whereby the object (2) is movable, and at least one sensor element (8) for collecting object data (31) of the object (2) to be moved and monitored, wherein the at least one sensor element (8) is arranged on at least one gripping jaw (5) with its sensor region (9) facing the receiving space (6), and is formed such that it detects, by means of at least temporary collection of the object data (31), a relative movement and/or relative velocity (26) of the object (2) with respect to at least one of the gripping jaws (5).

30 Claims, 9 Drawing Sheets

Figure 1:
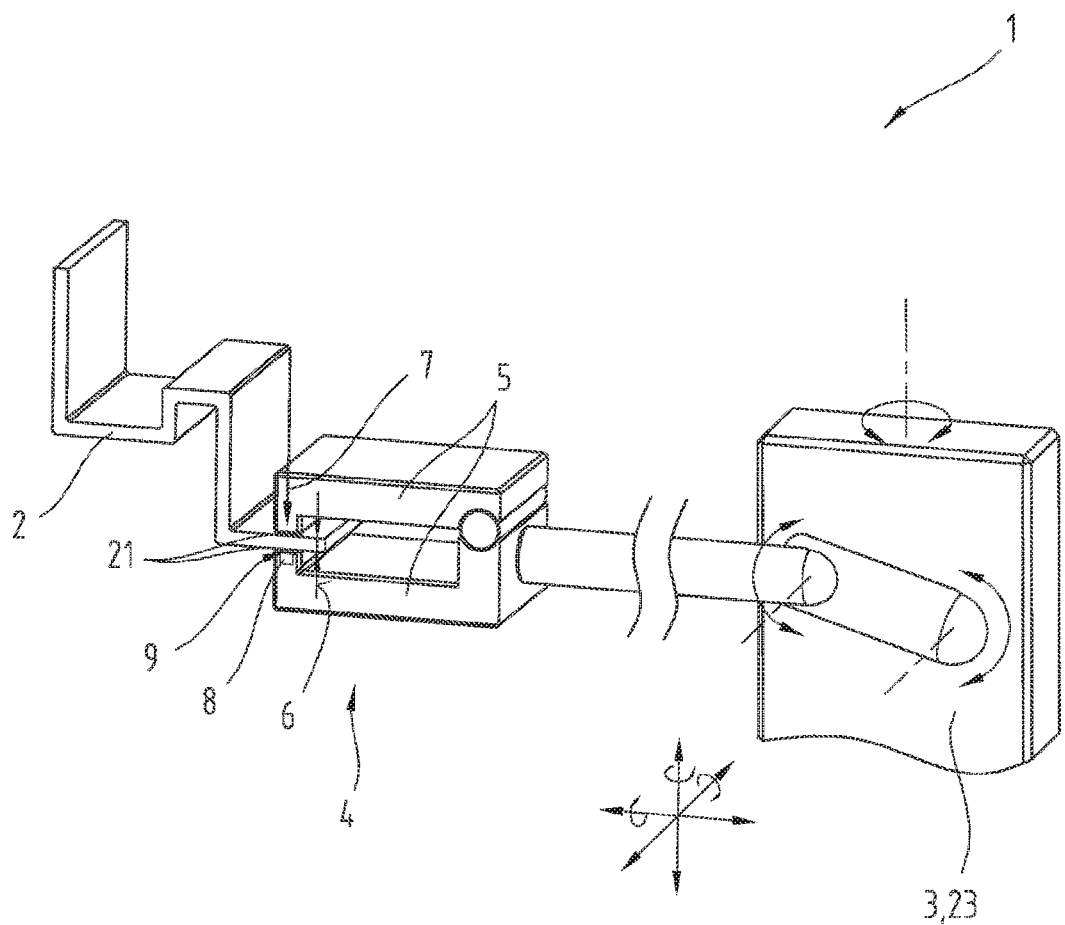

(51) Int. Cl.
   *B25J 13/08*     (2006.01)
   *B25J 15/02*     (2006.01)

(56) References Cited

U.S. PATENT DOCUMENTS

| | | | |
|---|---|---|---|
| 4,725,826 A | 2/1988 | Hunter | |
| 4,990,815 A | 2/1991 | Lindner et al. | |
| 5,182,936 A * | 2/1993 | Sartorio | B21D 43/003 72/422 |
| 6,341,243 B1 * | 1/2002 | Bourne | G05B 19/4097 700/165 |
| 6,644,080 B2 * | 11/2003 | Lindstrom | B21D 5/002 72/19.4 |
| 7,422,411 B2 | 9/2008 | Downs et al. | |
| 7,954,623 B2 | 6/2011 | Helm | |
| 8,935,004 B2 | 1/2015 | Iida | |
| 9,764,474 B2 | 9/2017 | Yamamoto et al. | |

FOREIGN PATENT DOCUMENTS

| | | |
|---|---|---|
| CN | 105922254 A | 9/2016 |
| CN | 106313095 A | 1/2017 |
| CN | 107309892 A | 11/2017 |
| DE | 37 10 380 A1 | 10/1988 |
| DE | 10 2005 032 502 B3 | 10/2006 |
| DE | 10 2006 025 387 B3 | 10/2007 |
| DE | 10 2016 000 565 A1 | 7/2016 |
| DE | 10 2016 206 980 A1 | 10/2017 |
| JP | S6138887 A | 2/1986 |
| JP | H0691587 A | 4/1994 |
| JP | H08108234 A | 4/1996 |
| JP | H0970786 A | 3/1997 |
| JP | 2001287179 A | 10/2001 |
| JP | 2002-166383 A | 6/2002 |
| JP | 2005502479 A | 1/2005 |
| JP | 2010201538 A | 9/2010 |
| JP | 2012206206 A | 10/2012 |

\* cited by examiner

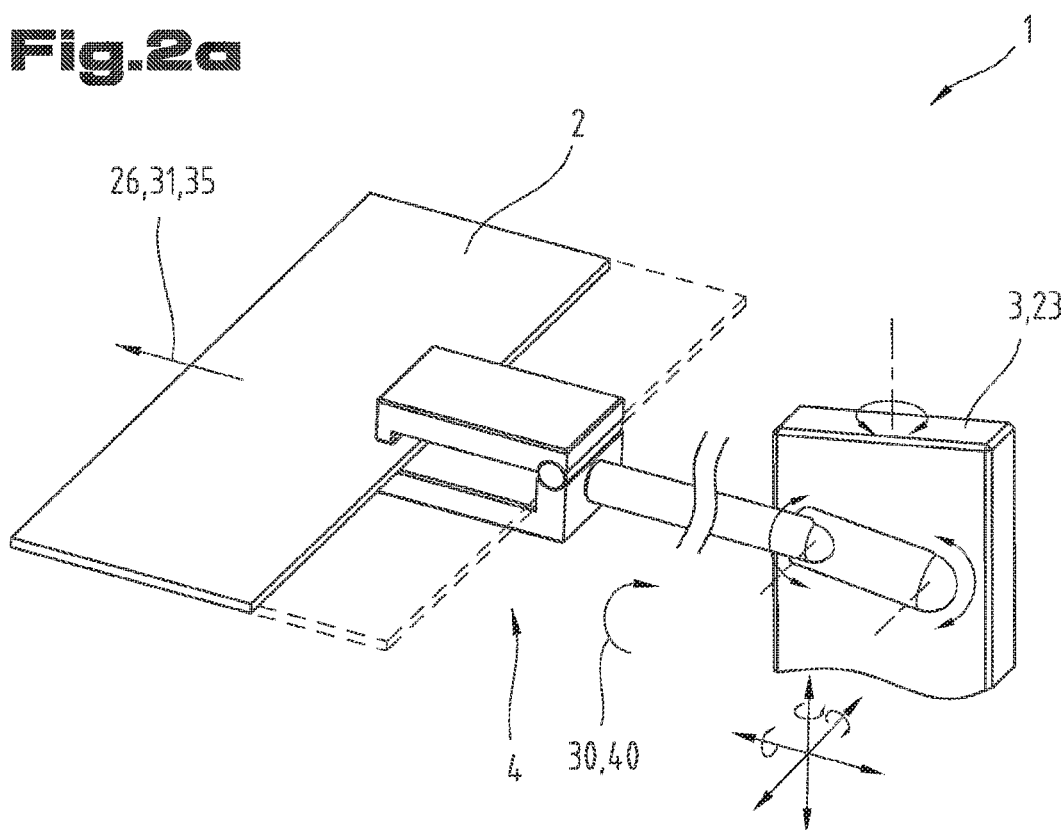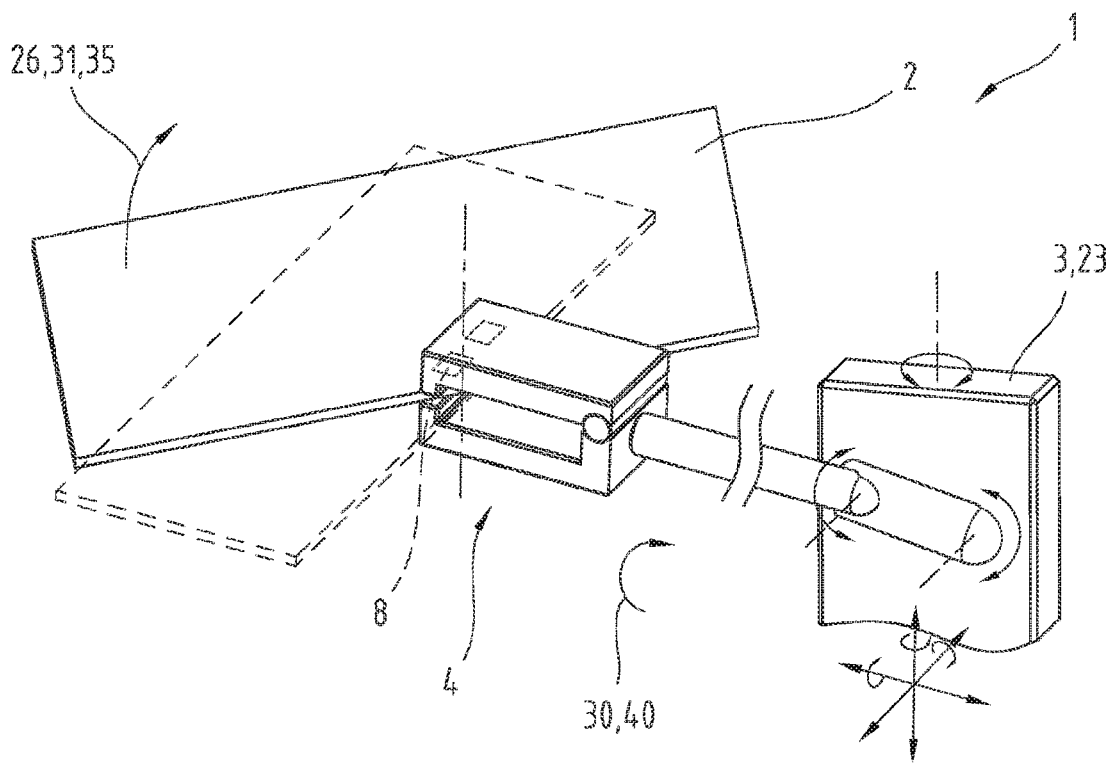

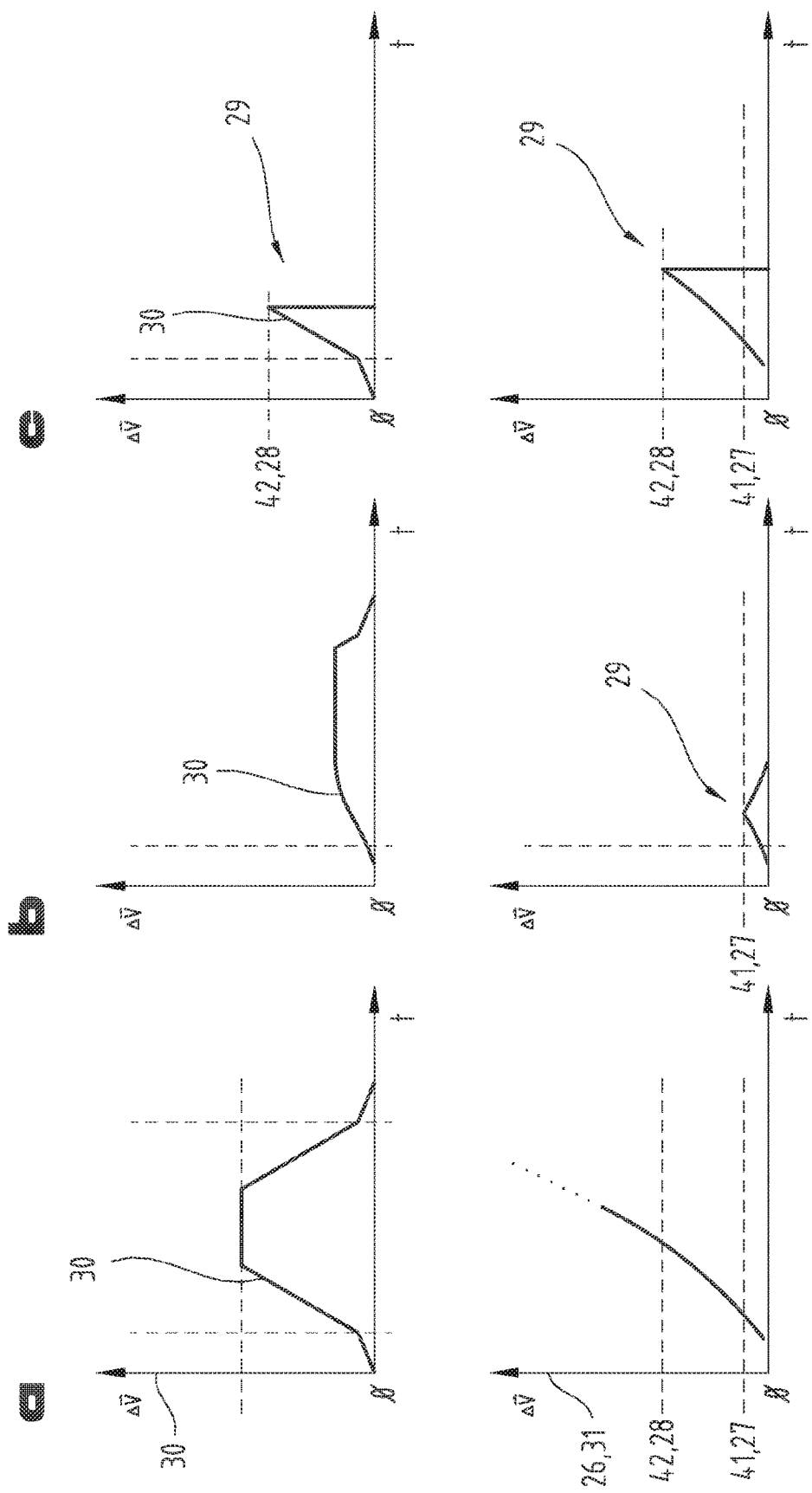

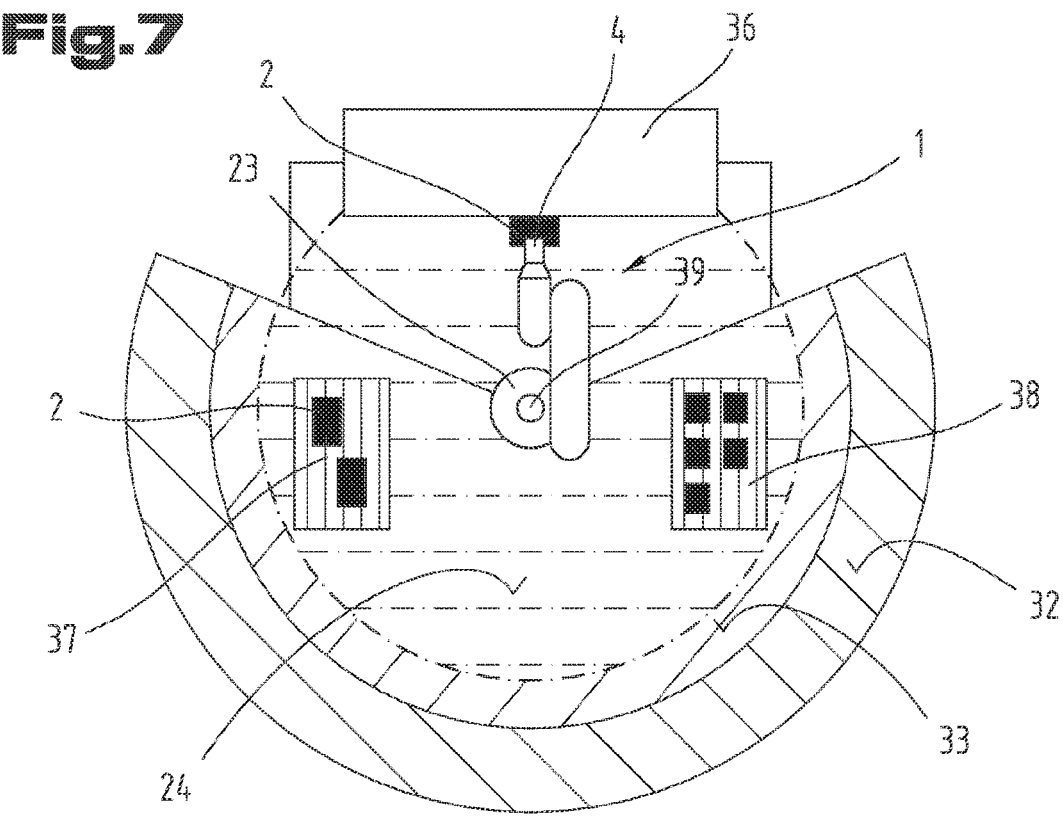
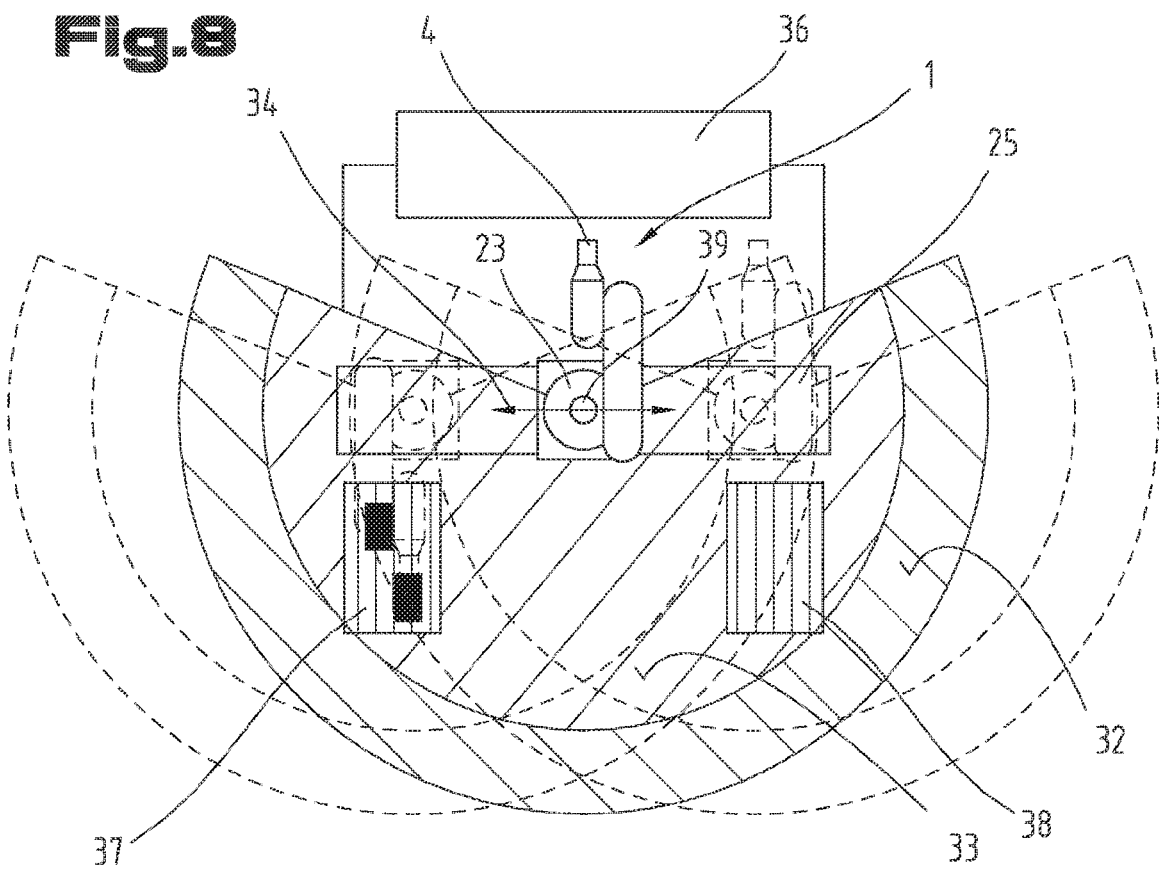

1

DEVICE AND METHOD FOR MONITORING RELATIVE MOVEMENTS

CROSS REFERENCE TO RELATED APPLICATIONS

This application is the National Stage of PCT/AT2019/060110 filed on Apr. 2, 2019, which claims priority under 35 U.S.C. § 119 of Austrian Application No. A 50273/2018 filed on Apr. 4, 2018, the disclosure of which is incorporated by reference. The international application under PCT article 21(2) was not published in English.

The invention relates to a device and a method for the monitored movement of objects, preferably sheet metals. The gripping device and the method in which the gripping device is used comprise a sensor arranged on a gripping module, which sensor can recognize a relative movement and/or relative velocity of the object to be moved relative to the gripping device and can initiate suitable countermeasures.

The invention further relates to a securing means which, as part of the gripping device, is designed to assume an active position if necessary, in which position a securing force in addition to a holding force is applied to the object to be moved.

Over the past years, various efforts have been made in forming technology to make the feeding, manipulation and/or removal of parts to be formed quicker and also safer for the process and the persons involved in it, such as a system operator. For some applications in which often monotonous and/or highly repetitive tasks have to be performed, the use of automated systems and/or robot systems have become prevalent. Also, in terms of ergonomics, it is appropriate to have very heavy and/or sharp-edged objects be moved by means of gripping devices instead of accepting a risk of injury for the system operator.

A number of types of robot devices and/or gripping devices connected therewith are known to the person skilled in the art, which devices cooperate with forming/processing systems in an automated manner, and which devices are connected with a system control for monitoring and controlling the individual system components.

The document DE 102016206980 A1 discloses a handling device in the form of a robot having two jaws for clamping a body. Tactile sensors are arranged on the insides of the jaws. Each of the tactile sensors can be provided with an elastic, in particular also a nonslip coating in order to ease the gripping of a body. By means of said tactile sensors, the pressure distribution and/or the changes in pressure distribution can be registered during the handling of the body. These can occur, for example, due to the body slipping out of the receiving device or due to collision of the receiving device or the body with an obstacle.

The document JP 2002166383 A discloses a system for a robot with which a slipping of an object in a gripper can be detected. For this purpose, pressure sensors, vibration sensors, acoustic sensors and acceleration sensors are provided on the gripping mechanism. An expansion body is arranged on each of the gripping arms.

The document DE 102016000565 A1 discloses a robot system having an intrusion detector which detects that a person has intruded a monitoring region established around a robot. The control device causes that a light emission device emits light when it is detected that a person has intruded the monitoring region.

Especially in the forming of sheet metal suction grippers are often used for gripping the sheet metal to be formed and to transport it to its destination. The document DE 102006025387 B3, for example, introduces a method for the monitored transport of sheet metals, which method allows the recognition of unwanted double sheets by means of sensors. However, the utilization of suction grippers requires a minimum gripping area for the suction head and requires clean surfaces. Furthermore, the suitability of using suction grippers for high gripping and movement velocities is limited. For this reason, pincer grippers are increasingly used nowa-days, which make smaller gripping areas possible and also allow for more diverse movement sequences. Moreover, the velocity of the gripping and/or travel movements can be increased by using gripping modules having at least two gripping jaws. However, this can entail the risk of an object such as a sheet metal and/or sheet metal part shifting within the gripping device due to the quick movements of the device and, at worst, being ejected from the gripping device.

Usually, an automated processing center, such as a bending machine with an assigned manipulator for parts and/or objects to be moved, is operated within a safety fence which is intended to prevent an inadvertent entering of foreign bodies, in particular persons, into the processing region. Furthermore, a safety fence arrangement and/or enclosure can serve for intercepting an object "ejected" from the gripping device and therefore to ensure the safety within the fenced-in processing region. Processing regions surrounded by safety fences often have to be secured in multiple places in a complex manner, in order to allow a temporarily required access to the processing region. This can be required, for example, to allow a supply of raw material or semi-finished products on a removal point for the gripping device, or, analogously to this, the transport of processed objects and/or parts from a rest. To that effect, a safety fence constitutes a procedural disadvantage. Moreover, the erection of a safety fence is associated with time and cost expenditures for the erection. When moving a processing center, consisting at least of a gripping device, a manipulator and a processing machine, the safety fence has to be newly erected and set up each time.

The object of the present invention was to overcome the disadvantages of the prior art and to provide a cost-effective device and a method by means of which an easy recognition of undesirable relative movements and/or relative velocities of objects to be moved within a gripping device during pre-definable movement sequences is made possible. Associated therewith is the object of initiating suitable countermeasures on the gripping device and/or components connected thereto of a forming system, if necessary. Another object which presents itself is to increase the safety and/or quality of the processing system and/or its periphery, and with that also for people, and, inter alia, to save costs of operation, repairs and/or material, and to be able to forgo complex safety fences.

This object is achieved by means of a device and a method according to the claims.

The gripping device according to the invention for the monitored movement of objects, preferably sheet metals, comprises a system control which is configured for processing object data and controlling a gripping module and/or further system components. The gripping module has at least two gripping jaws formed to cooperate with one another, and which form an intermediate receiving space for receiving at least parts of an object, in particular a sheet metal part, to be monitored and transported. The gripping jaws of the gripping module are formed such that, by applying a pre-definable clamping force, at least one friction-type connection between the gripping jaws and at least parts of the object is made possible, whereby the object is movable, i.e. grippable and transportable. Moreover, the gripping device comprises at least one sensor element for collecting object data of the object to be moved and monitored. Object data may refer to information on location and/or position, i.e. position data, relative to the sensor arrangement, as well as an object velocity. In this regard, the at least one sensor element is arranged on at least one gripping jaw with its sensor region facing the receiving space, and formed such that, by means of an at least temporary collection of the object data, a relative velocity of the object with respect to at least one of the gripping jaws is detected.

The method according to the invention for the monitored movement of objects, preferably sheet metals, therefore comprises the method steps of:

providing a gripping device according to one of claims 1 to 16, providing at least the object to be moved;

gripping the object to be moved by means of gripping jaws of the gripping device;

moving the object according to a pre-definable movement sequence, wherein a collection of movement data of the gripping device takes place and an at least periodical evaluation of the movement data by a system control takes place, and collecting object data of the gripped and moved object by means of at least one sensor element takes place and an at least periodical evaluation of the object data takes place in the system control; and at least periodically comparing the object data with the movement data is used for detecting a potential deviation which corresponds to a relative velocity and/or relative movement of the object to be moved, relative to at least one of the gripping jaws, and wherein no deviation corresponds to a normal operation and the predefined movement sequence is terminated; or in the event of a detected deviation, an initiation of at least one, preferably multiple, counter-measure(s) takes place via the system control.

The gripping device according to the invention can be formed to carry out multiaxial movements in space, which means that the gripping device is preferably embodied as part of a multiaxial manipulator and/or robot. The movements of the gripping device can be predefined according to the necessary processing steps of an object, in particular a sheet metal part. The movement sequences are made available and processed in a system control in the form of movement data. Such system controls are known to the person skilled in the art, as are multi-axial manipulators and/or robots, which is why a further description is forgone at this point. The movement data of the gripping device are determined at least at periodic intervals, or acyclically following a command of the system control and/or e.g. a system operator, and, in borderline cases, continuously, and made available to the system control. The movement data comprise the movement velocity and/or movement direction and/or the acceleration of the gripping device and/or of the gripping module, whereby the exact position of the gripping jaws can be predefined and/or measured as a function of the time and is therefore known. The collection of the movement and/or position data of the gripping device generally takes place by means of sensors as they are known to the person skilled in the art and are thus not explained further. The described arrangement of gripping jaws and the at least one sensor element with its sensor region in the receiving space is what makes measuring the object data and thus, the detection of a relative movement and/or relative velocity of the object relative to the gripping device accessible. Within the context of this invention, the designation relative movement is representative for the relative velocity, but also for the relative acceleration of the object. The collection of these object data of the gripped and moved object by means of at least one sensor element takes place at least periodically but can also be triggered acyclically by the system control or, in borderline cases, take place continuously. The movement and object data can therefore be collected and checked by the system control and can, at least periodically, be compared to one another.

Especially in sheet metal processing, e.g. in bending, pressing or embossing, the necessary movement sequences can be very diverse and can necessitate the coordination of the forming and/or processing machine with a feeding/manipulation and/or removal device. One advantage of the gripping device and/or the method according to the invention lies in the decrease of the risk that an object, preferably a sheet metal or sheet metal part, may shift, whereby the travel velocity of the gripping device can be optimized. This means that, for each object, the travel velocity can be increased so much that no slipping out of the receiving space takes place because a recognition of a relative movement and/or relative velocity of the object is immediately recognized by the system control and at least one suitable countermeasure is initiated. A positioning of an object to be moved, the positioning being made quicker and more exact by this, towards, within and/or away from the processing machine can increase the productivity and decrease the operating costs.

A further advantage of the gripping device according to the invention and/or the method according to the invention is that the erection of a safety fence for the purpose of stopping the movement of possible ejected sheet metals can be forgone. Furthermore, the probability of wrongfully placed objects before a subsequent processing step is significantly reduced, as it can happen, e.g. with sheet metal/parts, if they are not correctly aligned relative to a bending line. The gripping device and/or the method consequently aids in also improving the quality of the components and decreasing possible costs for repair, maintenance, downtime and material.

The idea according to the invention allows the person skilled in the art to determine the size of the gripping device themselves, scaling also the size of the receiving space which develops between the at least two gripping jaws. The gripping device often does not grip the entire object along an edge, but rather, will be smaller in at least one direction with respect to the object to be moved. A small strip being clamped by two gripping jaws whose width is greater than the width of the strip is also easily conceivable. Therefore, the gripping device can also be formed to be larger in a direction relative to the object or at least parts of the object. However, it is advantageous if, when gripping at least parts of the object, the at least one sensor element not only recognizes "that" an object is gripped but also which weight and/or shape and/or position the at least parts of the object have relative to the gripping device.

Therefore, it can be useful if the sensor element is configured to at least periodically collect a position and/or a location and/or weight of the object as object data.

This entails the advantage that the at least one sensor element can recognize a non-correct position in a horizontal direction, but also an incorrect position in a vertical direction and/or horizontal direction, meaning e.g. of "lopsidedly" aligned raw parts or semi-finished products with respect to the gripping tool. A correction of the gripping device can be automatically initiated by the system control in order to correctly align the object for a subsequent method step. Additionally, a double sheet recognition can take place, e. g. by determining the weight. These measures can contribute in a crucial manner to the increase of safety and quality.

Further, it can be provided that the sensor element is formed to be at least an optoelectronic, preferably laser optic and/or acoustic and/or capacitive and/or inductive sensor element.

This measure allows the person skilled in the art to optimize the design the gripping device dependent on the material and/or the surface quality of the objects to be moved. For electrically conductive and magnetic materials, for example, inductive sensor elements may be used. Acoustic sensor elements can also be used for electrically non-conductive and/or non-magnetic materials. Capacitive sensor elements also have almost no limitations set by electrical conductivity and/or magnetic properties. Here, the possible sensor elements are mainly proximity switches, distance sensors and, with a particular preference, acceleration sensors as at least one sensor element. Optoelectronic sensor elements have the advantage that they are economical and versatile and also are subject to almost no limitations set by electric conductivity and/or magnetic properties of the material of the object to be moved. Image-capturing sensor elements such as a CCD camera and suchlike are examples for what can be used as optoelectronic sensor elements. Likewise, simpler light sensors are conceivable to be used as optoelectronic sensor elements. Laser optical sensor elements are particularly preferred as their wavelength and/or range of energy can be selected relatively independent of stray light and/or shadowing. This allows to reduce the influence of possible surface contaminations or reflecting surfaces which could cause blurring in the detection of relative velocity. Moreover, by using laser optical sensor elements, a very high precision and detection speed of a relative movement and/or relative velocity of an object can be achieved.

Furthermore, it can be provided that two sensor elements are arranged to be connected, in a signal-based redundancy, with the system control.

Signal-based redundancy is understood to mean that both sensor elements are assigned to the same object and/or the same part of an object to be moved, and that their measurement signals can be collected and evaluated, preferably simultaneously, by the system control. The measure can increase the process safety in the event of a sensor element being damaged or contaminated. Moreover, such an arrangement is suitable for detecting a non-linear movement of an object. This can be, for example, a rotation movement or a lateral shifting about a rotation axis within the gripping device. In a borderline case, a rotation axis of the object could coincide with an axis of the sensor element in the direction of a sensor region, whereby a the relative movement of the object are not detected as a "linear relative velocity" at a first sensor element. A second, adjacently arranged sensor element, however, would be able to detect the relative movement and/or relative velocity of the object due to the redundancy circuit.

An embodiment according to which it can be provided that the inner surfaces of the gripping jaws are formed to be at least partially alignable to be parallel to one another is also advantageous.

The formation of gripping jaws, which have sections that are at least partially parallel to one another and/or alignable to be parallel to one another and which are therefore at least partially alignable to be parallel, has the advantage that the at least one sensor element has a consistent orientation, i. e. a consistent sensor region, relative to objects to be gripped having different sizes. This adaption allows for a higher quality of the measurement of the at least one sensor element, even if the receiving space has to be of a different size because, e. g. the object size varies. Moreover, by forming parallel inner surfaces and/or contact surfaces of the gripping jaws, as compared to a punctiform contact surface, the surface pressure on the object can be reduced. This can be advantageous particularly with sensitive object surfaces. Furthermore, the parallel inner surfaces can avoid an unwanted lateral lowering of the object after gripping taking place, if the object is gripped away from its center of gravity. Such a lowering to one side could lead to the object being held and moved in an "lopsided" plane, whereby a subsequent processing step can possibly not be carried out at all or only in a deficient manner or make an additional correction of the position necessary. In summary, parallel sections lead to a faster, more exact and therefore more process-safe positioning and gripping of the objects to be moved, whereby costs can be saved, and the quality can be increased.

According to a further development, it is possible that at least one gripping jaw is formed to be rotatable about a clamp axis and has at least one angle correction means for increasing the clamping force on the object to be gripped.

One or multiple ones of such angle correction means are preferably arranged on an end section of a gripping jaw. An angle correction means also serves for aligning the inner surface of the end section of the gripping jaw in parallel to the surface of at least one part of the object. Thus, an angle between an end section and the clamp axis is corrected and the force on the gripping jaw is always applied normally to the object surface via the angle correction means. An angle correction means is preferably formed only on the gripping jaw(s) on which no sensor element is arranged, whereby the sensor region of the at least one sensor element on a corresponding gripping jaw is not compromised. Moreover, it is achieved that the receiving space between at least two gripping jaws is variable for objects of different sizes. Such an angle correction means can, e. g. be a pivotable gripping plate which adapts to the alignment of the gripping jaw angle correction means the object surface. Likewise, an angle correction means can also be formed as an elastic body on the inner surface of a gripping jaw, such that, in the event of a closing movement of the gripping jaws, it adapts in parallel to the object surface at least along a contact line, preferably contact surface. A rubber lamella or suchlike is particularly conceivable here.

Furthermore, it can be useful if the gripping device is formed to be a pincer gripper which preferably has two gripping jaws and/or pincers rotatable about the clamp axis.

For some applications, it can have advantages if all gripping jaws and/or pincers are rotatable about a common clamp axis because this way, the center of the receiving space is always located on the same plane between the end sections of the gripping jaws with a normal on the clamp axis. This facilitates a very homogeneous application of force onto the object surface, which can contribute to increasing the quality. Moreover, by using the gripping jaws designed in the form of pincers, objects can be gripped which locally have a larger dimension than the receiving space between the gripping jaws. This is advantageous especially in the forming of sheet metal parts because the sheet metal can consequently be held between the gripping jaws, but e. g. a formed edge can be positioned between the gripping jaws, i. e. behind the receiving space and in front of the clamp axis. Therefore, even complex shapes of objects are grippable.

It can be alternatively provided that at least one gripping jaw is formed to be displaceable in parallel to the second gripping jaw.

This form of a plate gripper, which is very easy to realize, allows a parallel picking up of objects, preferably sheet metals, and can therefore be produced in a cost-efficient manner as only one gripping jaw has to be formed to be displaceable in parallel to the second gripping jaw.

Moreover, it can be provided that the gripping device is formed as a plate gripper which has two gripping jaws and/or plates which are movable normal with respect to a clamp axis.

The formation of two gripping jaws on the gripping module displaceable in parallel to one another allows that the center of the receiving space between the gripping jaws remains in one plane with an imagined extension of the gripping device. Thus, the application of force is independent of the component thickness and/or a local diameter of an object to be moved and can take place in a very homogeneous manner on the object surface, which can contribute to the improvement of the quality. Moreover, the gripping jaws designed in the form of plates and/or gripping plates are particularly suitable for the transport and/or manipulation of sheet metal, as the sheet metal is held between the plates by a comparatively large surface, whereby a great resistance against shifting is ensured.

In particular, it can be advantageous if a friction lining is arranged on at least one inner surface, facing the receiving space, of at least one gripping jaw for increasing the friction of the gripping jaw to at least parts of the object surface.

The increase of friction between gripping jaws and the parts of the object surface on which the gripping jaws grip is a particularly preferred measure to achieve a gentle handling of the object surface. Additionally, the safety during gripping and against shifting of the object is increased. For this, friction linings are conceivable which have a friction coefficient with respect to steel that is higher than the one of steel with respect to steel. The preferred material for this is elastic polymers which have a sufficiently high friction coefficient with respect to steel, as the shaping of them is relatively simple and they are relatively easy to replace and inexpensive.

Furthermore, it can be provided that at least one gripping jaw comprises at least one securing means formed thereon in the direction of the receiving space and one friction lining formed to be movable in the direction of the clamping force. The friction lining is preloaded with a spring force and is formed to be movable between a rest position and an active position. The rest position corresponds to the situation that the spring force acting on the friction lining is less great than the clamping force of the gripping device, whereby only the friction lining is in contact with at least parts of the object surface and the at least one securing means remains set back relative to the surface of the friction lining In the active position, wherein the clamping force exceeds the spring force of the friction lining, the at least one securing means protrudes with respect to the surface of the friction lining, whereby a securing force is applied at least in a punctiform manner by that on at least parts of the object surface.

Thus, this securing means remains hidden in a rest position below the inner surface of the gripping jaw during a normal operation, or at maximum, on the same plane of the inner surface and/or the friction lining, in order to not damage the object surface. When a deviation between object data and movement data is detected, which deviation corresponds to a relative movement and/or relative velocity of the object to be moved, countermeasures are initiated by the system control. One of these countermeasures can be the active position of the securing means, wherein the friction lining is moved out of its rest position by means of application of a clamping force exceeding the spring force, and therefore the securing means abruptly protrudes relative to at least parts of the inner surface and/or the friction lining of the gripping jaw. In doing so, the securing means is brought into contact with at least parts of the object surface in addition to the inner surfaces by means of a pre-definable securing force. This embodiment can cause an increase of the local surface pressure without necessarily causing damage to the object. This can contribute to the increase of the process and system safety.

According to a particular embodiment, it is possible that the at least one securing means for applying an at least punctiform securing force on at least parts of an object surface is formed to be spike- and/or hook-shaped.

It has proven advantageous if the securing means can act on the object with a locally increased securing force, which object carries out an inadvertent relative movement. The object to be moved is therefore not held anymore with a holding force only by means of a friction-type connection between the gripping jaws, but additionally, an interlocking connection is secured by means of the securing force acting in a substantially punctiform manner Here, the holding force must be significantly greater than the spring force. At that, the securing means can be designed to be hemispherical and/or claw-shaped and/or spike- and/or hook-shaped, whereby the securing effect can be increased. A plastic deformation of the object surface can be tolerated due to the increased safety. The friction lining and/or the securing means can be returned to the rest position after the described countermeasure by means of acknowledgment of an error message, replacement of the damaged component and/or object etc.

According to an advantageous development, it can be provided that the friction lining is formed to be movable by a hydraulic, pneumatic, mechanical and/or electromechanical spring means.

It has proven advantageous that the spring force is applied via an additional and/or independently controllable drive. The gripping jaws and/or the gripping module and/or the gripping device are usually driven hydraulically and/or electromotively. It can be provided that the friction lining is mounted via a spring means, such that a spring force acts upon the friction lining in the direction of the receiving space and is independent of e. g. a supply of the gripping jaws and/or the gripping module. It is possible to apply the spring force hydraulically via a separate hydraulic line, which is not connected to the hydraulics of the gripping device. It is equally conceivable that spring means is supplied by a pneumatic line that is independent of the drive of the remaining gripping module. As an alternative to this, or as a support, the friction lining can be preloaded with a spring means, which is formed with a spring force, e. g. mechanically via a relatively simple spring element, such as a coil spring or leaf spring. It is also conceivable that the spring means and the friction lining are made as one piece from a spring-elastic material, preferably a synthetic plastic material, which intrinsically has the predefinable spring force. In the active position of the securing means, a clamping force is applied to the object surface, which clamping force exceeds the spring force of the spring means on the friction lining, whereby the securing means is pressed against the object surface.

Moreover, it can be provided that the gripping module is formed as an at least biaxially movable manipulator, preferably a multiaxial robot.

An automated processing center which comprises multiple components, such as an object provision or removal, a processing machine, a rest for the finished processed objects, the gripping device according to the invention is particularly advantageously the part of a movable, preferably multiaxial robot, which serves as a gripping tool. By this, the degrees of freedom of the gripping device in interaction with a multiaxial robot are increased and an increase of the travel velocity of the gripping module and/or the robot is allowed without the risk of the object shifting.

Furthermore, it can be provided that the manipulator is formed to be movable along a travel path for increasing a movement region of the manipulator.

This constitutes a cost-efficient and simple-to-realize measure to adapt the movement region of a manipulator to the requirements of an automated processing center. This measure is particularly advantageous to keep the total dimensions of the robot and/or manipulator small while increasing the range along a, preferably horizontal, travel path. The travel direction can be predefined by the system control.

An embodiment, according to which it can be provided that the at least biaxially movable manipulator has at least one laser optical safety scanner connected with the system control for detecting a possible foreign body in a pre-definable warning region and a pre-definable stopping region, is also advantageous.

The laser optical safety scanner is preferably arranged at a raised position of the robot, such that an unobstructed line of sight to the processing region is ensured. This means that the laser optical safety scanner is preferably arranged at the top of an arm of a robot or on a turret of the robot, at a location which allows the warning region and the stopping region to be located in an unobstructed line of sight to the safety scanner. In doing so, the laser optical safety scanner can e. g. emit a network of rays of light or light beams onto the floor of the processing region, which network is detected by the safety scanner upon entry of a foreign object.

A warning region and a stopping region can be defined in advance, which are recorded in the system control and define the processing region as a kind of "fictitious safety fence". The vertical rotation axis of the robot should be used as the center of the warning and stopping region, wherein the start of the warning region should be located at a greater distance therefrom that the stopping region. It has proven advantageous for the safety of people that the warning region has at least the movement radius of the robot and therefore of the gripping device and the maximum dimensions of the respective parts to be moved, in the horizontal direction, and an additional safety distance of 0.5 to 5.0 m (meters), preferably 1.5 to 2.5 m. The stopping region is positioned to abut the warning region or overlap it and is defined by the movement radius robot and therefore the gripping device and the maximum dimensions of the respective parts to be moved, in the horizontal direction, and a smaller additional safety distance of 0.2 to 2.0 m, preferably 0.5 to 1.0 m.

The warning region defines a processing region in which, upon detection of a foreign body, at least one countermeasure is initiated, which corresponds to a first stage, and is initiated from the group: increasing the clamping force of the gripping jaws, and/or decelerating a travel velocity of the gripping device, and/or triggering a first optical warning signal, and/or triggering a first acoustic warning signal, and/or lowering the moved object in the vertical direction. Analogously to this, the stopping region defines a processing region in which, upon detection of a foreign body, at least one countermeasure is initiated, which corresponds to the a second stage, and is initiated from the group: stopping the movement of the gripping device and/or of the robot, and/or active position of the securing means, and/or triggering a first or a second optical warning signal different from the first, and/or triggering a first or a second acoustic warning signal different from the first. This way, it can be achieved that the safety for people is made possible even at high travel velocities of the gripping device and a safety fence can be forgone.

In this method, the warning region and/or stopping region do not necessarily have to be distanced from the vertical rotation axis of the manipulator and/or robot in a concentric and/or symmetric fashion. It is quite possible that the dimensions of the finished parts are substantially less than those of the semi-finished product or sheet metal, whereby the rest can be located closer to the robot than the receiving point. As a result, an asymmetrical processing region and therefore warning and/or stopping region can be defined, which allows for a more compact arrangement of adjacent processing centers than would be possible using symmetrical regions.

Moreover, the warning and/or stopping regions within the scope of the invention are not stationary, but can, in particular when combined with a manipulator movable along a travel path, be moved along relative to the manipulator and therefore have a movable fixed point. This allows that, even during the process, an exchange of provided objects, meaning e. g. semi-finished products or finished parts, can be carried out when the warning region and/or stopping region are distanced from the respective region, as the manipulator, and therefore the processing region, is distanced therefrom. This would not be possible with a stationary safety fence but would rather necessitate complicated and complex transfer stations.

The method for the monitored movement of objects, preferably sheet metals, according to the invention comprises the following method steps:
  providing a gripping device according to one of the aforementioned features, therefore at least comprising a gripping module, which has at least two gripping jaws formed to cooperate with one another, which gripping jaws form an intermediate receiving space for receiving at least parts of an object to be monitored and transported, and the gripping jaws are formed such that, by applying a pre-definable clamping force, at least a friction-type connection between the gripping jaws and at least parts of the object is made possible, whereby the object is movable, as well as at least one sensor element for collecting object data of the object to be moved and monitored, wherein the at least one sensor element is arranged on at least one gripping jaw with its sensor region facing the receiving space, and is configured to detect, by means of at least temporary collection of the object data, a relative movement and/or relative velocity of the object with respect to at least one of the gripping jaws;
  providing at least the object to be moved;
  gripping the object to be moved by means of gripping jaws of the gripping device;
  moving the object according to a pre-definable movement sequence, wherein collecting movement data of the gripping device takes place and at least periodically evaluating the movement data by a system control takes place, and collecting object data of the gripped and moved object by means of at least one sensor element takes place, and at least periodically evaluating the object data takes place in the system control; and at least periodically comparing the object data with the movement data is used for detecting a potential deviation which corresponds to a relative velocity of the object to be moved, relative to at least one of the gripping jaws, and wherein no deviation corresponds to a normal operation and the predefined movement sequence is terminated; or in the event of a detected deviation, an initiation of at least one, preferably multiple, countermeasure(s) takes place via the system control.

A series of advantages and features of the method according to the invention have already been mentioned at the suitable section regarding the gripping device and its functional principle, which is why they will not be repeated at this point.

However, it is of practical significance if a series of threshold values are defined in the system control for determining the deviation between movement data and object data, which threshold values ensure a relative movement and/or relative velocity of the object, preferably of the sheet metal to be moved. In doing so, a certain tolerance limit can be provided. Optimized threshold values for the initiation of countermeasures of the first stage, as well as threshold values that are higher with respect to the first threshold values for initiating countermeasures of the second stage can be recorded in the system control. Different processes and/or movement sequences and objects can require different threshold values.

According to a further development, it is therefore possible that the initiation of the at least one countermeasure takes place in two stages dependent on the extent of the relative velocity, wherein at least one countermeasure of a first stage is initiated upon reaching a first threshold value, and wherein at least one countermeasure of a second stage is initiated upon reaching a second threshold value.

The initiation of the at least one countermeasure takes place preferably starting from a first threshold value of the relative velocity of 0.1-2.0 mm/s and/or a second threshold value of the relative velocity of more than 2.1 mm/s, particularly preferably 1.0 mm/s, dependent on the extent of the relative velocity.

The use of such safety threshold values serves the increase of the safety of the process and people. In addition to this, the two-stage initiation of countermeasures allows that the processing step can potentially still be completed without making a stopping or termination of the process necessary.

The grouping of countermeasures of the first and second group has been previously described for the application in the detection of a foreign body in the warning and/or stopping region and is therefore not repeated, but referenced, at this point. The initiation of countermeasures takes place according to the invention at least having one stage, preferably two stages. Thus, it is possible to record in the system control, which movement sequence and/or which methods optimized first and second threshold values are defined for, in order to initiate the at least one countermeasure of the first and/or second stage. However, it should be noted at this point that particularly the increase of the clamping force and/or the deceleration of the travel velocity of the gripping device can allow the processing step to still be completed. Furthermore, a securing means, on the inner surface of the gripping jaws, can additionally be brought into contact with the object by significantly increasing the holding force and overcoming the spring force acting on the friction lining, whereby a securing force can be applied in addition to the holding force of the gripping jaws. A system operator can, by means of recognizing an acoustic and/or optical warning signal, take possible manual correction measures. Using the lowering of the moved object downwards in the vertical direction as a countermeasure has the primary advantage that in the worst case of the object slipping, said object has a predefined downwards trajectory and can therefore not be ejected, in an uncontrolled manner, beyond the warning and/or stopping region, and thus the processing region of the processing center.

As an addition, it should be noted here that, upon detection of a relative movement and/or relative velocity, which necessitates at least one countermeasure of the second stage, that is by reaching the second threshold value, the countermeasure can be initiated immediately. For the second optical and/or acoustic warning signal, a different warning signal should be used than what would be used in the warning region and/or in initiating a countermeasure of the first stage. This measure prevents mix-ups. By stopping the movement of the gripping device, the slipping of the object can be efficiently avoided.

Moreover, it can be useful if, in the active position of the at least one securing means, the clamping force is abruptly increased to exceed the spring force acting on the friction lining, whereby the friction lining is moved out of its rest position, in which the securing means is hidden in the direction of the receiving space, such that the at least one securing means abruptly protrudes relative to the friction lining. Thereby, the at least one securing means can be brought into contact with at least parts of the object surface in an abrupt manner, applying an additional securing force.

This local increase of surface pressure on the component can lead to a reduction of the relative movement and/or relative velocity of the component as the clamping force of the gripping jaws is supplemented by the securing force of the at least one securing means. Here, the securing force can be selected at a height, in order to avoid a plastic deformation of the object to be moved.

Furthermore, it can be provided that the at least one securing means at least partially penetrates in at least parts of the object surface. Thereby, a plastic deformation of the gripped parts of the object surface occurs and an, in addition to the friction-type connection of the gripping jaws and the object, an interlocking connection thus takes place.

For this, the clamping force must significantly exceed the spring force of the spring means acting on the friction lining. Although, in doing so, a damaging of the object surface and/or the component to be produced occurs, these countermeasures efficiently avoid, in a borderline case, a slipping of the object out of the gripping device. This countermeasure, in keeping with the above description, is advantageously to be initiated as a countermeasure of the second stage, only when increased relative movements and/or relative velocities of more than the second threshold value 2.1 mm/s, preferably more than 1.0 mm/s are detected.

According to a particular embodiment, it is possible that at least one second sensor element for collecting the object data is used.

The corresponding principle of operation and its individual advantages have been previously mentioned with respect to the device, which is why they are not repeated here.

For the purpose of better understanding of the invention, it will be elucidated in more detail by means of the figures below.

These show in a respectively very simplified schematic representation:

FIG. 1 An embodiment of a gripping device which has gripped on an object by means of gripping module;

FIG. 2 a schematic representation of possible relative movements of an object and/or sheet metal relative to the gripping device in linear (a) relative movement, or rotating (b) relative movement;

FIG. 3 exemplary embodiments for gripping modules, wherein the gripping jaws are designed as pincers (a) (b) or plates (c) (d);

FIG. 4 exemplary embodiments for gripping modules, wherein the angle correction means are designed as a pivotable gripping plate (a) (b) or an elastic body (c) (d) on a gripping module;

FIG. 5 a schematic representation of the detection of relative movements and initiation of countermeasures (a) to (c);

FIG. 6 a schematic sectional representation of a gripping module with securing means in the rest position (a) and/or an active position (b);

FIG. 7 an exemplary embodiment of an automated processing center as seen from a bird's-eye perspective, with movement region, warning region, stopping region of a safety scanner of the gripping device;

FIG. 8 an exemplary embodiment of an automated processing center with a laterally movable gripping device.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

FIG. 1 represents an exemplary embodiment of a gripping device 1 according to the invention, which comprises a gripping module 4 and a system control 3. The gripping module 4 has at least two gripping jaws 5 that are formed to cooperate with one another and which grip an object 2 on at least a part of the object surface 21. It can be seen well in FIG. 1 that the object 2 can have almost any desired shape, as long as an engaging of the gripping jaws 5 is made possible. The represented component and/or object 2 is an example for a semi-finished product from an angled sheet metal, which, in a forming machine and/or bending machine 36. is fed to the next forming step.

FIG. 1 further shows that the gripping device 1 can have an at least biaxial, movable manipulator 23, which is designed as a multiaxial robot in the exemplary embodiment. The cantilever and/or robot arm of the manipulator 23 is designed to be rotatable by 360°, as well as vertically and horizontally pivotable and/or retractable and extendible. In the present example, this means that the manipulator 23 is designed to have six axes. The fact that the manipulator 23 and/or the gripping device 1 has multiple axes is schematically adumbrated by the combined x-, y-, z-axis symbol with the respective rotation arrows in FIG. 1 and FIG. 2 and is the preferred variant for all embodiments according to the invention. Furthermore, the gripping module 4 is formed in the object-facing end of the manipulator 23, whereby the gripping device 1 gains a high degree of versatility. The drive of the manipulator 23 and of the gripping module 4 is preferably designed to be electromechanical. A clamping force 7 can be applied, separately by its own drive, to the gripping jaws 5 and thus to the object 2.

As it is adumbrated in FIG. 1 to FIG. 5 as well as FIG. 7 and FIG. 8, the system control 3 can be arranged on or in the gripping device 1 as a component of the same. However, it is equally conceivable that the system control 3 is arranged to be decentralized from the gripping device 1 and e. g. is arranged in a display or operating element not further represented.

FIG. 1 when viewed in combination with FIG. 3 further schematically adumbrates that a receiving space 6 is delimited by the cooperating gripping jaws 5 in the region in which they can receive an object 2 on their inner surfaces 10. Furthermore, sensor elements 8 are arranged on a gripping jaw 5 such that their sensor region 9 is facing the object surface 21 of the object 2 to be moved in the receiving space 6.

The following discussion of FIG. 2 and FIGS. 1, 3, 4, 7 and 8 describes by way of example how the collection of movement data 40 of the gripping device 1 and/or the gripping module 4 and an at least periodical evaluation of these movement data by the system control takes place. Furthermore, a collection of object data 31 of the gripped and moved object 2 by means of at least one sensor element 8 and an at least periodical evaluation of the object data 31 takes place in the system control 3. Thus, an at least periodical comparison of the object data 31 with the movement data 40 is made possible to detect a possible deviation, which corresponds to a relative velocity 26 of the object 2 to be moved relative to at least one of the gripping jaws 5 and therefore to the gripping module 4 and/or the gripping device 1 and to initiate suitable countermeasures 29.

FIG. 2 serves for illustrating some possible modes of movement of an object 2 gripped and moved by the gripping device 1. The range of the detection of relative velocities 26 of an object 2 to be moved, made possible by the gripping device 1 according to the invention, is only adumbrated schematically here. The gripping device 1 and/or the gripping module 4 can move along and/or about multiple axes. The movements of the gripping module 4 and/or the gripping device 1 in the space are controlled by the system control 3 according to a pre-definable movement sequence and at least periodically provided by sensors not further depicted and the system control 3 in the form of movement data 40.

In FIGS. 2a and 2b, a travel velocity 30 of the gripping module 4 about an imagined vertical axis is described by way of example. This angular velocity of the represented example, however, is to be understood such that linear movements of the gripping module 4 can also have, in an analogous manner, a travel velocity 30 and/or corresponding movement directions. The movement data 40 available in the system control 3 thus comprise the local velocities and the corresponding position of the gripping device 1 and/or of the gripping module 4 at a certain point in time. Relative movements and/or relative velocities 26 deviating from this, thus can be derived by the person skilled in the art analogously to the exemplary situations shown.

The sensor elements 8, represented in a dotted fashion in FIG. 2, are arranged in one of the two represented gripping jaws 5 of the gripping module 4 and allow a collection of the object data of the gripped and moved object 2. From the exemplary arrangement of sensor elements 8, it can be seen that the adjacent arrangement having sensor regions 9, each facing the receiving space 6, makes a redundancy circuit possible.

FIGS. 2*a* and 2*b* represent, with the aid of a sheet metal, the intended movement of an object 2 with a travel velocity 30 of the gripping module 4, wherein a relative movement and/or relative velocity 26 in the centrifugal direction 35 occurs.

The depiction in FIG. 2*a* shows by way of example that the object 2 and/or the sheet metal is moved, in the centrifugal direction 35, out of its original receiving position, shown in dashed lines. The situation is represented such that the relative movement takes place in a substantially linear fashion, with a relative velocity 26 of the object 2 relative to the gripping jaw 5 and/or to the gripping module 4. In the course of this, the relative movement and/or relative velocity 26 of the sheet metal takes place orthogonally to the direction of movement of the gripping device 1 and can be detected by both sensor elements 8, shown in a dotted fashion.

In FIG. 2*b*, a borderline case is represented by way of example, in which the object 2 and/or an end of the sheet metal is rotated out of the gripping module 4 in the direction of the travel velocity 30. In doing so, a relative movement and/or relative velocity 26 is caused, which comes to a rotation or turning movement about the axis of one of the sensor elements 8 and/or its sensor region 9. This relative movement 26, however, can be detected efficiently by means of a signal-based redundancy circuit with the second, adjacent sensor element 8 in order to initiate suitable countermeasures.

The FIGS. 3*a* to 3*d* represent, by way of example, some embodiments of gripping modules 4 with differently arranged and/or formed gripping jaws 5. A clamp axis 11 is represented, around which at least one gripping jaw 5 and/or relative to which clamp axis 11 at least one gripping jaw 5 is formed to be displaceable. All represented exemplary embodiments have two sensor elements 8 although the invention can also be executed with only one and/or also with multiple sensor elements 8. The representations also show gripping jaws 5 which are formed to be furcate, which, within the scope of the invention, is also transferable to all embodiments of gripping jaws 5.

Figure 3A:
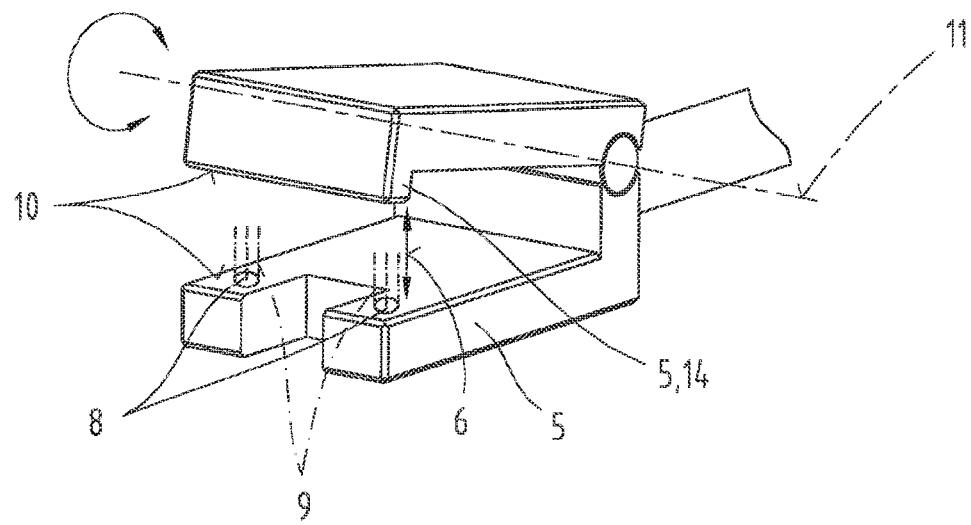
Figure 3B:
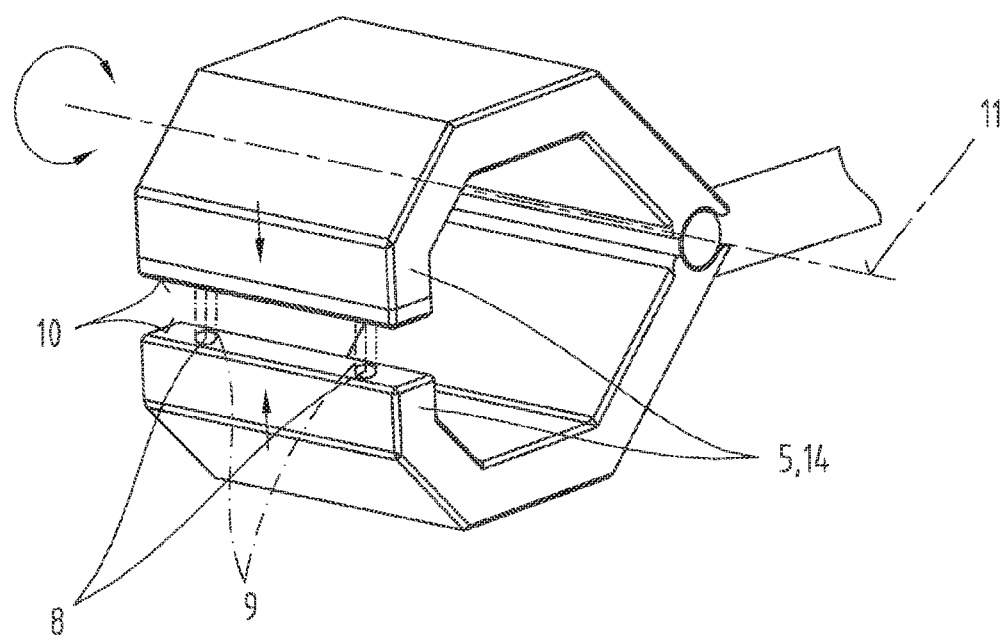

In FIG. 3*a*, a pincer gripper 12 is represented, wherein a gripping jaw 5 is equipped with two sensor elements 8 and to which a corresponding gripping jaw 5 is arranged to be rotatable about the clamp axis 11. Analogously to this, the pincer gripper 12, too, is formed with two to one another two gripping jaws 5 and/or pincers 14 rotatable about the clamp axis 11. In both cases, the receiving space 6 is formed in the region where the two gripping jaws 5 meet and in which an object 2 can be received.

Figure 3C:
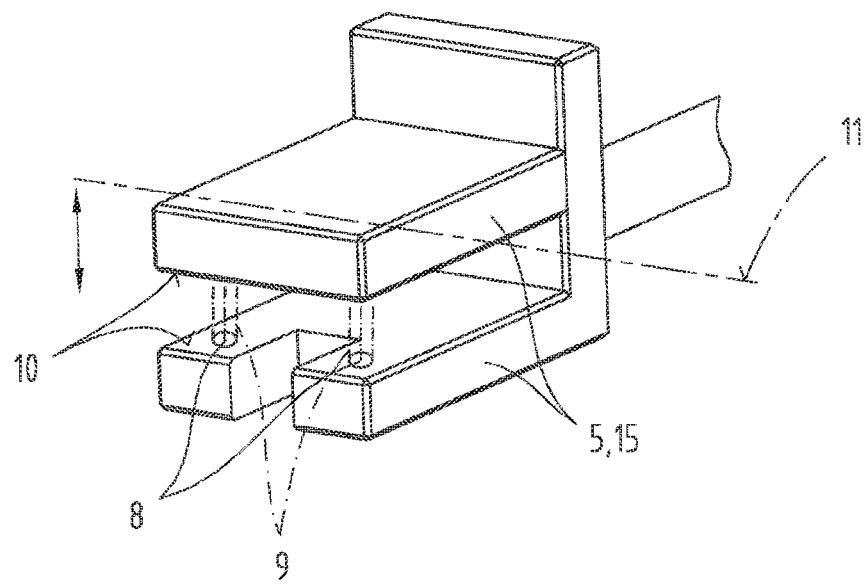
Figure 3D:
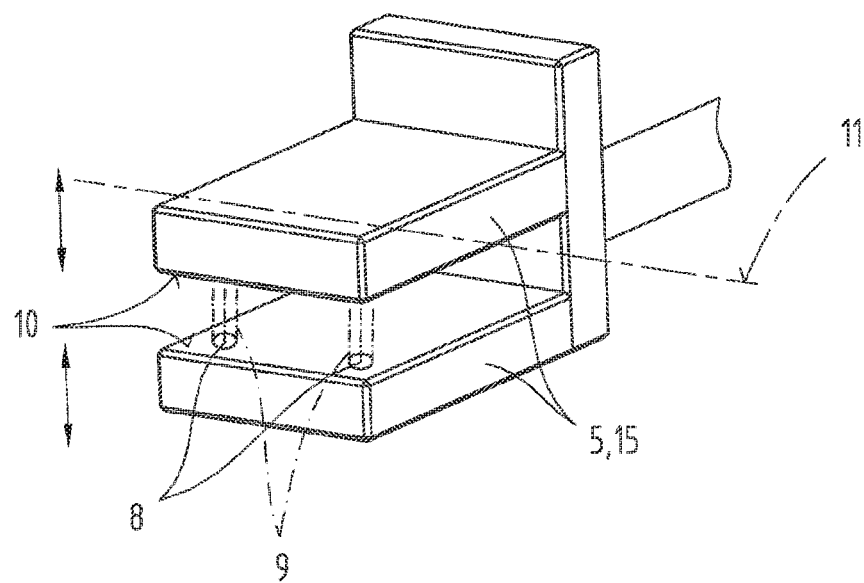

In FIGS. 3*c* and 3*d*, two possible embodiments for plate grippers 13 are depicted, in which the clamp axis 11 can vary in terms of the position of the gripping jaws 5 and/or plates 15. The embodiment in FIG. 3*c* merely shows a displaceable gripping jaw 5 and/or plate 15 which can be displaced in parallel to the clamp axis 11 and the corresponding plate 15 This relatively simple form offers cost-related advantages. In FIG. 3*d* is an example of two gripping jaws 5 and/or plates 15 that are displaceable in parallel to one another.

FIGS. 4*a* to 4*d* show some possible exemplary embodiments for gripping modules 4 whose inner surfaces 10 of the gripping jaws 5 are formed to be at least partially alignable to be parallel to one another. These embodiments are fully compatible with the embodiments of FIG. 1 to FIG. 3, in particular, however, advantageous when using pincer-shaped gripping jaws 5 and/or pincers 14.

FIGS. 4*a* to 4*d* represent very simple examples of a pincer gripper which has a gripping jaw 5 and/or pincer 14 rotatable about the clamp axis 11. In order to compensate for different sheet metal thicknesses and/or object diameters or thicknesses, it is possible to obtain, by means of angle correction means 16, a parallel rest and/or gripping area for the clamping force 7 between the movable gripping jaw 5 and/or the pincer 14 to the object 2 and/or sheet metal. The functionality of the at least one sensor element 8, represented in dashed lines, is ensured by this measure as a parallel object surface 21 with respect to the sensor region 9 ensures a high measuring certainty and precision.

Figure 4A:
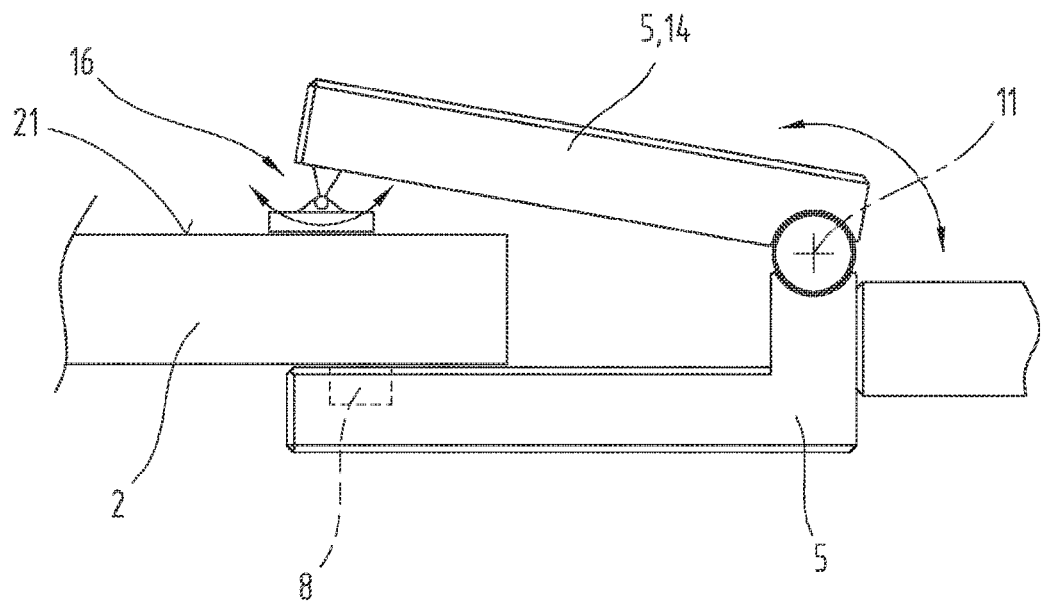
Figure 4B:
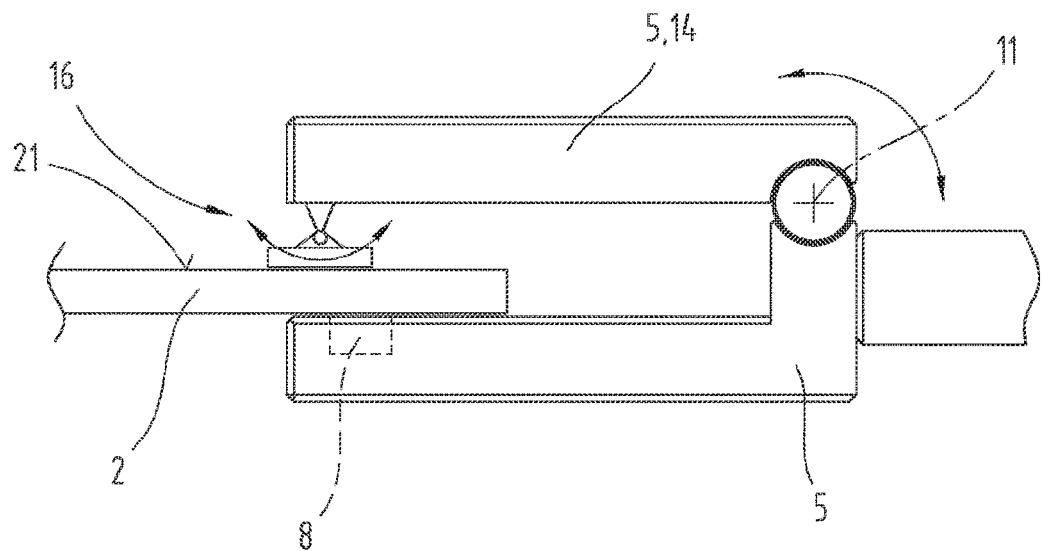
Figure 4C:
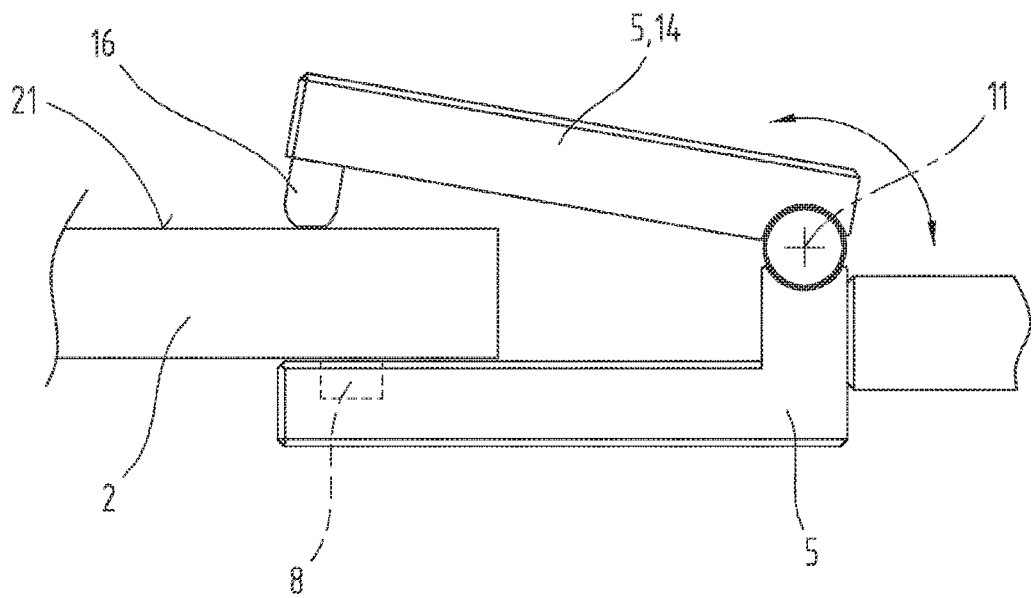
Figure 4D:
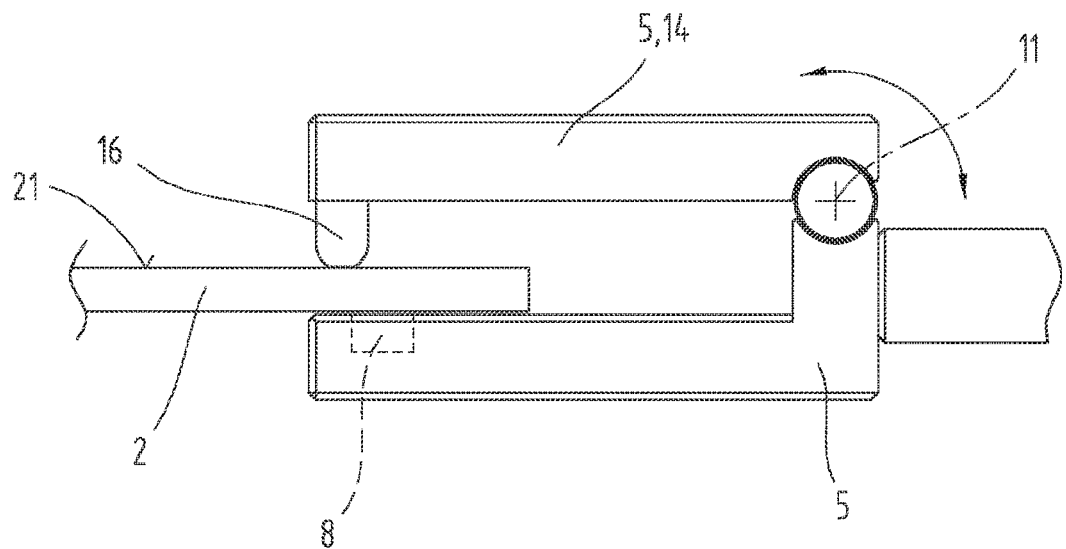

The angle correction means 16 can be formed very simply by means of a pivotable gripping plate as depicted in FIGS. 4*a* and 4*b*. Thus, instead of the inner surface 10 of the pincer 14, the angle correction means 16 is always in a parallel contact with at least a part of the object surface 21 as it adapts to the orientation of the gripping jaw 5 and/or the object surface 21. As per FIG. 4*c* and FIG. 4*d*, an angle correction means 16 can also be formed to be an elastic body on the inner surface of a gripping jaw 5 and/or pincer 14 and adapt, upon a closing movement of the gripping jaws 5, at least along a contact line, preferably contact surface, parallel to the object surface 21 of the object 2 to be gripped. As per the exemplary representations, a thinner sheet metal or also object 2, as shown in FIGS. 4*b* and 4*d*, can be contacted and held with a clamping force 7 just as well as a comparatively thick sheet metal and/or object 2, as shown in FIGS. 4*a* and 4*c*.

The functional principle of the gripping device 1 and/or the method according to the principle is to be briefly explained with the aid of FIGS. 5*a* to 5*c*. The y-axes indicate correlating velocities and/or movements, while the x-axes define the common time axis for the respective partial representations. The top row of the respective partial figure shows possible travel velocities 30 and/or collected movement data 40 of the gripping module 4 as a function of the time. These are collected by sensors, not depicted, of the gripping device 1 and made accessible to the system control 3. Thus, the bottom row schematically represents temporally corresponding relative velocities 26 and/or the measured object data 31, which are collected by at least one sensor element 8 of the gripping module 4 and are also transmitted to the system control 3. The dashed lines indicate reference lines for ease of orientation.

FIG. 5*a* represents a possible case in which the movement of the gripping module 4 causes a slipping of the object 2. In a first step, which equates to the removal of a gripped object 2 from a removal point 37, the travel velocity 30 is slowly increased. After this phase of removal or starting up, the travel velocity 30 is increased up to a maximum which is maintained for a certain time in order to transport the object 2 to its destination as quickly as possible. In this phase, the sensor element 8 detects a relative velocity 26 which can be seen from the zero line as a deviation of the corresponding lower partial figure. The object 2 is made to carry out a relative movement and/or a relative velocity 26, evidently due to the movement of the gripping module 4. The measured object data 31 suggest, due to the increasing incline, that the object 2 moves continuously faster relative to the gripping jaw 5 and thus to the gripping module 4 and/or the gripping device 1, up to a point at which it escapes from the gripping device 1 in an uncontrolled manner, which is adumbrated by the dotted line. The movement data 40 of the gripping module 4 suggest that no countermeasures 29 have been initiated as the travel velocity 30 of the gripping module 4 in the top partial figure of FIG. 5a initially stays constant to then slow down when nearing the target position. The representation in FIG. 5a therefore represents the undesirable case of the uncontrolled loss of an object 2 and/or sheet metal from the gripping device.

FIG. 5b, on the other hand, shows that, upon increasing the travel velocity 30, i. e. upon a first increase of the movement data 40 when starting up the gripping module 4 in the top partial figure, a corresponding relative velocity 26 by the collection of object data 31 takes place. In this case, at least a first countermeasure of the first stage 27 is initiated upon reaching a first threshold value 41. In the specific example, the travel velocity 30 is reduced and maintained at a constant value in order to stop the relative movement and/or relative velocity 26 of the object 2. Compared to the example in FIG. 5a the travel velocity 30 is at a lower, constant level and is maintained for a longer period to achieve the same travel.

However, it has proven advantageous if at least one countermeasure of a first stage is initiated already upon a deviation of more than 0.1 mm/s (millimeters/second) as the first threshold value 41. Thus, countermeasures of the first stage are initiated with deviations of 0.1 to approximately 2.0 mm/s, preferably to 1.0 mm/s, while at least one countermeasure of a second stage is initiated upon deviations of more than 2.1 mm/s, preferably already 1.1 mm/s, as a second threshold value 42. Such a case is represented schematically in FIG. 5c. Analogously to FIGS. 5a and 5b, the travel velocity 30 of the gripping module 4 is increased. The increase of the relative velocity 26 of the object 2, however, is very fast, the countermeasures 29 of the first stage initiated upon reaching the first threshold value 41 do not suffice, whereby the relative velocity 26 further increases and the second threshold value 42 is reached. This initiates the at least one countermeasure 29 of the second stage 28, whereby an abrupt stop of the gripping module 4 and thus, a halt of the travel velocity 30 is caused. This is followed by a stop to the relative velocity 26 and efficiently prevents the object 2 from slipping out of the gripping module 4.

The discussion on the initiation and sequence of countermeasures 29 in FIG. 5 with respect to reaching first and second threshold values 41, 42 is to be transferred analogously to the gripping of a foreign body in the warning region 32 and/or stopping region 33 of the gripping device 1.

In order to increase the safety, a securing means 17 can be arranged on or within at least one gripping jaw 5. As it is shown in a sectional representation in FIGS. 6a and 6b, the two gripping jaws 5 apply a clamping force 7, of which only one side is depicted for the sake of clarity, to the object 2 and/or its object surface 21. Furthermore, it is clearly evident that two sensor elements 8 are arranged in the respective lower gripping jaw 5 and that their sensor region 9 is facing the object 2. In the exemplary embodiment of FIG. 6, a friction lining 22 for increasing the friction between gripping jaw 5 and object 2 is affixed to the side of the gripping jaw 5 that faces the object 2.

Figure 6A:
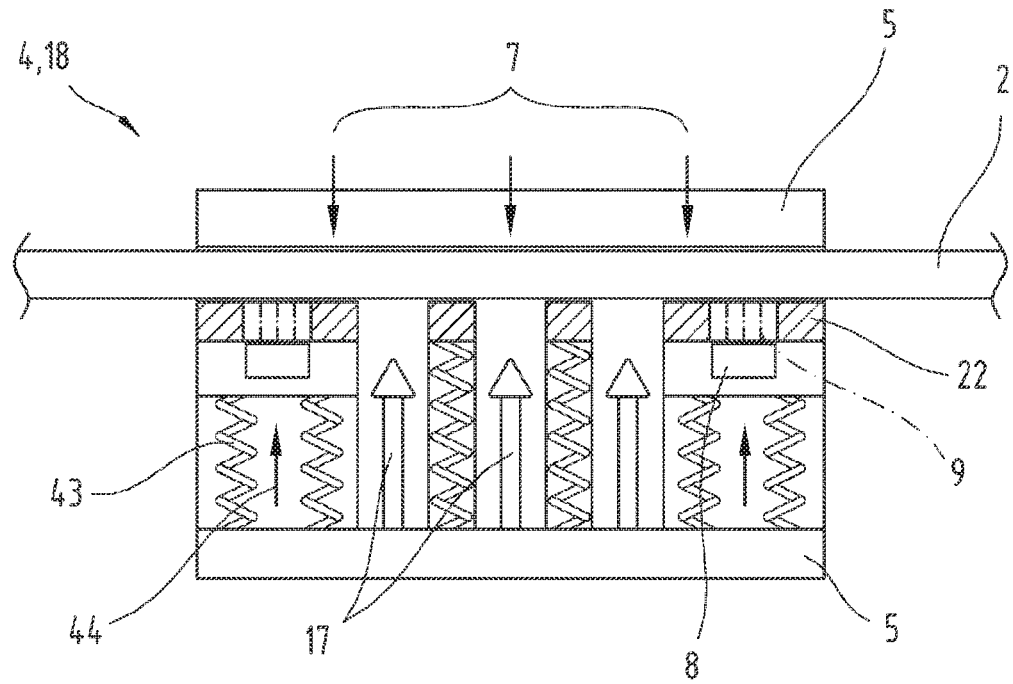

From FIG. 6a, the normal or rest position 18 of the securing means 17 can be seen, in which position it is arranged to be hidden below the friction lining 22 in order to not damage the object surface 21. The represented form of the securing means 17 as a spike, as well as the preloaded spring means 43, represented as spring elements, are to be understood merely as exemplary, simple, mechanical embodiments for the functional principle of the securing means 17 and/or the mounted friction lining 22. The spring means 43 can also be replaced by or combined with a pneumatic, hydraulic and/or electromechanical drive for applying the spring force 44 to the friction lining 22. Likewise, it is conceivable that the spring means 43 is formed in a single piece with a spring-elastic friction lining 22 for applying the spring force 44. The effective direction of the clamping force 7 is only depicted from one side for the sake of clarity. However, it is clear to the person skilled in the art that the clamping force 7 can be applied to the object 2 from both gripping jaws 5.

Upon reaching a first threshold value 41 or second threshold value 42, the at least one securing means 17 can, as a countermeasure 29, be brought into an active position 19 and protrude abruptly relative to at least parts of the friction lining 22 of the gripping jaw 5 in order to contact at least parts of the object surface 21 with a pre-definable securing force 20. As it is represented in FIG. 6a, the friction lining 22 and/or the securing means 17 are positioned in the rest position 18 as long as the clamping force 7 acting on the object 2 is lower than the spring force 44 acting on the friction lining 22. An increase of the clamping force 7 up to the level of the spring force 44 causes a non-destructive contacting, not depicted, of the object 2 by the securing means 17, whereby an additional securing force 20 can be applied to at least parts of the object surface 21. The additional securing force 20 allows for a deceleration of the relative movement and/or relative velocity 26 of an object 2 as it is represented, for example, in FIG. 5b.

Figure 6B:
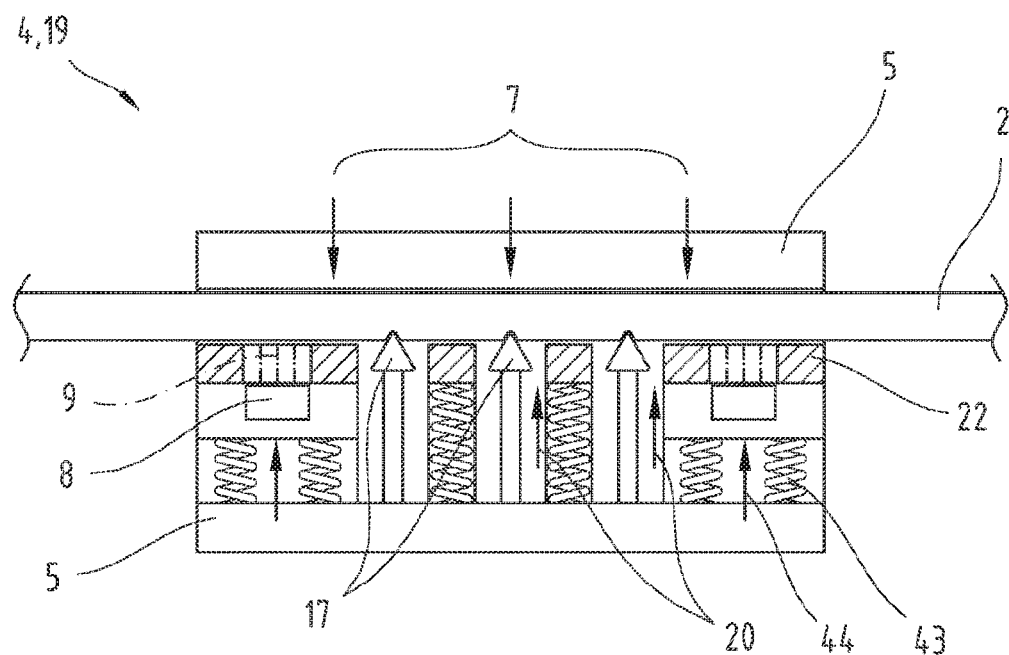

In FIG. 6b, a further example for a possible active position 19 of the securing means 17 is represented, wherein the at least one securing means 17 penetrates in at least parts of the object surface 21. This is achieved by means of a significant, abrupt increase of the clamping force 7 relative to the spring force 44. Thereby, a plastic deformation of the gripped parts of the object surface 21 is initiated, which cases an interlocking connection in addition to the friction-type connection of the gripping jaws 5 and the object 2. This countermeasure 29 depends on the amount of the clamping force 7 and can be recorded in the system control 3, just like a pre-definable securing force 20.

In FIG. 7 and FIG. 8, further and possibly independent embodiments of the gripping device 1 are shown, wherein again, equal reference numbers and/or component designations are used for equal parts as in the preceding FIG. 1 to FIG. 6. In order to avoid unnecessary repetitions, it is pointed to the detailed description in the preceding figures, in particular the discussion on the initiation and sequence of countermeasures 29 of FIG. 5 with respect to reaching first and second threshold values 41, 42.

In FIG. 7 and FIG. 8, an automated processing center having a bending machine 36 with an associated, multiaxial manipulator 23 for parts and/or objects 2 to be moved is represented by way of example. Furthermore, a removal point 37 with objects 2 arranged thereon, i. e. the semi-finished parts, is represented, and a rest 38 for the finished processed objects 2. The movement region 24 of the gripping device 1, which comprises the multiaxial manipulator 23, is shown hatched. Within this movement region 24, a movement of the gripping module 4 with or without a gripped object 2 is possible.

In order to be able to forgo safety fences by using a gripping module 4 having at least one sensor element 8, the detection of inadvertently entering foreign bodies, in particular persons, is performed by a safety scanner 39 within the processing region. In place of the safety fence surrounding the processing center, only a part of the safety fence flanking the bending machine 36 is represented.

As it can be seen in FIG. 7 and FIG. 8, a stopping region 33 and, after that, a warning region 32, starting from the vertical rotation axis of the manipulator 23, abut the movement region 24 of the gripping device 1. The warning region 32, which begins further outwardly, defines a processing region within which, upon detection of a foreign body, the same measures are initiated as when reaching a first threshold value 41 of a relative movement and/or relative velocity 26 of the object 2. Thus, at least one countermeasure of the first stage is initiated here. The detection of a foreign body in the stopping region 33, located further inwardly, of the gripping device 1 is to be transferred analogously to the reaching of the second threshold value 42 and the initiation of at least one countermeasure of the second stage.

FIG. 8 shows a further exemplary embodiment, wherein a gripping device 1 comprises a manipulator 23 movable along a travel path 25 laterally, meaning horizontally, in a travel direction 34. The gripping device 1 therefore has multiple warning 32, stopping 33 and/or processing regions, differently from a stationary operation, which regions are represented schematically at the corner points of the travel path 25. The movement region 24 and the stopping regions 33 and the warning region 32 are consequently moved along, along the travel path 25, corresponding with the position of the gripping device 1, and thus have a kind of movable fixed point. For the sake of ease of clarity, no movement region 24 is represented in FIG. 8, although it is hereby included with reference to FIG. 7. By extending the processing region in a travel direction 34 and/or along a travel path 25, it is made possible that, even during the process, an exchange of provided objects 2, meaning, for example semi-finished products or finished parts, can be performed when the movement region 24 and/or the warning region 32 and/or the stopping region 33 are momentarily located at a distance and therefore a region of the processing center can be entered hazard-free.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

| 1 | gripping device |
|---|---|
| 2 | object |
| 3 | system control |
| 4 | gripping module |
| 5 | gripping jaw |
| 6 | receiving space |
| 7 | clamping force |
| 8 | sensor element |
| 9 | sensor region |
| 10 | inner surface |
| 11 | clamp axis |
| 12 | pincer gripper |
| 13 | plate gripper |
| 14 | pincer |
| 15 | plate |
| 16 | angle correction means |
| 17 | securing means |
| 18 | rest position |
| 19 | active position |
| 20 | securing force |
| 21 | object surface |
| 22 | friction lining |
| 23 | manipulator |
| 24 | movement region |
| 25 | travel path |
| 26 | relative velocity |
| 27 | first stage |
| 28 | second stage |
| 29 | countermeasure |
| 30 | travel velocity |
| 31 | object data |
| 32 | warning region |
| 33 | stopping region |
| 34 | travel direction |
| 35 | centrifugal direction |
| 36 | bending machine |
| 37 | removal point |
| 38 | rest |
| 39 | safety scanner |
| 40 | movement data |
| 41 | first threshold value |
| 42 | second threshold value |
| 43 | spring means |
| 44 | spring force |

The invention claimed is:

1. A gripping device for the monitored movement of objects, comprising:
   a gripping module comprising at least a first gripping jaw and a second gripping jaw cooperating with each other and forming an intermediate receiving space for receiving at least parts of an object to be monitored and transported, each gripping jaw of the first gripping jaw and the second gripping jaw having at least one inner surface facing the receiving space;
   at least one sensor element having a sensor region for collecting object data of the object to be monitored and transported;
   a system control configured for processing the object data and controlling the gripping module;
   wherein the first gripping jaw and the second gripping jaw are formed such that, by applying a pre-definable clamping force, at least a friction-type connection between the first gripping jaw and the second gripping jaw and the at least parts of the object is made possible for moving the object;
   wherein the at least one sensor element is arranged on at least one gripping jaw of the first gripping jaw and the second gripping jaw so that the sensor region faces the receiving space, and is formed such that the at least one sensor element detects, by at least temporary collection of the object data, a relative movement and/or relative velocity of the object with respect to the at least one of the first gripping jaw and the second gripping jaw;

wherein, on the at least one inner surface, a friction lining is arranged for increasing the friction of the at least one gripping jaw of the first gripping jaw and the second gripping jaw to an object surface of the at least parts of the object;

wherein the at least one gripping jaw of the first gripping jaw and the second gripping jaw comprises at least one securing means formed thereon;

wherein the friction lining is preloaded with a spring force and is movable in a direction of the clamping force, between a rest position and an active position;

wherein in the rest position, the friction lining is arranged to protrude beyond the at least one securing means; and in the active position, the friction lining is arranged offset back relative to the at least one securing means for applying an at least punctiform securing force to the object surface of the at least parts of the object.

2. The gripping device according to claim 1, wherein the at least one sensor element is configured to at least periodically collect a position and/or a location of the object as the object data.

3. The gripping device according to claim 1, wherein the at least one sensor element is formed to be at least an optoelectronic and/or an acoustic and/or a capacitive and/or an inductive sensor element.

4. The gripping device according to claim 1, wherein two sensor elements are arranged to be connected with the system control in a signal-based redundancy.

5. The gripping device according to claim 1, wherein the at least one inner surface of each of the first gripping jaw and th second gripping jaw is formed to be at least partially alignable to be parallel to one another.

6. The gripping device according to claim 5, wherein the at least one gripping jaw of the first gripping jaw and the second gripping jaw is formed to be rotatable about a clamp axis and has at least one angle correction means for increasing the clamping force on the object to be gripped.

7. The gripping device according to claim 6, wherein the gripping device is formed to be a pincer gripper.

8. The gripping device according to claim 5, wherein the first gripping jaw is formed to be displaceable in parallel to the second gripping jaw.

9. The gripping device according to claim 8, wherein the gripping device is formed as a plate gripper which has the first gripping jaw and the second gripping jaw and/or plates which are movable normal with respect to a clamp axis.

10. The gripping device according to claim 1, wherein the rest position can be taken at a clamping force that is lower relative to the spring force and the active position can be taken at a clamping force that is higher relative to the spring force.

11. The gripping device according to claim 1, wherein the at least one securing means for applying the at least punctiform securing force on the object surface of the at least parts of the object is formed in a shape of a spike and/or a hook.

12. The gripping device according to claim 1, wherein the friction lining is formed to be movable by a hydraulic, pneumatic, mechanical and/or electromechanical spring means.

13. The gripping device according to claim 1, wherein the gripping module is formed as a gripping tool of an at least biaxial movable manipulator.

14. The gripping device according to claim 13, wherein the at least biaxially movable manipulator is formed to be movable along a travel path for increasing a movement region of the manipulator.

15. The gripping device according to claim 13, wherein the at least biaxially movable manipulator has at least one laser optical safety scanner connected with the system control for detecting a possible foreign body in a pre-definable warning region and a pre-definable stopping region.

16. The gripping device according to claim 1, wherein the object to be monitored and transported is a sheet metal.

17. A method for the monitored movement of objects comprising the method steps of:

providing the gripping device according to claim 1
gripping the object to be moved with the first gripping jaw and the second gripping jaw of the gripping device;
moving the object according to a pre-definable movement sequence, wherein
collecting movement data of the gripping device takes place and
at least periodically evaluating the movement data by the system control takes place, and
collecting the object data of the gripped and moved object by the at least one sensor element takes place, and
at least periodically evaluating the object data takes place in the system control; and
at least periodically comparing the object data with the movement data to obtain a comparison and using the comparison for detecting a potential deviation which corresponds to a relative movement and/or relative velocity of the object to be moved relative to the at least one of the first gripping, and
wherein
no deviation corresponds to a normal operation and the predefined movement sequence is terminated; or
in the event of a detected deviation, an initiation of at least one countermeasure takes place via the system control.

18. The method according to claim 17, wherein a position and/or location of the object is collected at least periodically by the at least one sensor element as the object data.

19. The method according to claim 17, wherein the at least one sensor element determines the object data at least optoelectronically and/or acoustically and/or capacitively and/or inductively.

20. The method according to claim 17, wherein an initiation of the at least one countermeasure takes place in first and second stages dependent on the extent of the relative velocity (26), wherein a first countermeasure of the first stage is initiated upon reaching a first threshold value, and wherein a second countermeasure of the second stage is initiated upon reaching a second threshold value.

21. The method according to claim 20, wherein, as the first countermeasure of the first stage (27) is initiated from the group:

increasing the clamping force of the first gripping jaw and the second gripping jaw;
decelerating a travel velocity of the gripping device;
the active position of the at least one securing means;
triggering a first optical warning signal;
triggering a first acoustic warning signal; and/or
lowering the moved object in a vertical direction.

22. The method according to claim 20, wherein, as the second countermeasure of the second stage is initiated from the group:
- stopping the movement of the gripping device;
- triggering a first or a second—different from the first—optical warning signal; and/or
- triggering a first or a second—different from the first—acoustic warning signal.

23. The method according to claim 21, wherein, in the active position of the at least one securing means, the clamping force is abruptly increased such that the spring force acting on the friction lining is overcome, such that the friction lining is moved out of the rest position and the at least one securing means protrudes abruptly relative to the friction lining and is brought into contact with the object surface of the at least parts of the object, applying an additional securing force.

24. The method according to claim 23, wherein the at least one securing means at least partially penetrates in the object surface of the at least parts of the object, whereby a plastic deformation of the object surface of the at least parts of the object occurs.

25. The method according to claim 17, wherein at least one second sensor element for collecting the object data is used.

26. The method according to claim 20, wherein, during an operation of the gripping device, a detection of a possible foreign body in a pre-definable warning region and a stopping region is carried out by a laser optical safety scanner connected to the system control.

27. The method according to claim 26, wherein, upon a detection of a foreign body in the warning region, the the first countermeasure of the first stage is initiated.

28. The method according to claim 26, wherein, upon a detection of a foreign body in the stopping region, the second countermeasure of the second stage is initiated.

29. The method according to claim 17, wherein a manipulator comprising the gripping module, in order to increase a movement region of the manipulator, moves along a travel path during the movement of the object.

30. The method according to claim 17, wherein the object to be moved is a sheet metal.

* * * * *